US005717906A

United States Patent [19]

Aratani

[11] Patent Number: 5,717,906

[45] Date of Patent: Feb. 10, 1998

[54] FRAME COMPARISON WITH REDUCED MEMORY VIA CHANGED SCANLINE DETECTION AND POST-ADDITION ROTATIONAL SHIFTING

[75] Inventor: Shuntaro Aratani, Kawasaki, Japan

[73] Assignee: Canon Kabushiki Kaisha, Tokyo, Japan

[21] Appl. No.: 497,421

[22] Filed: Jun. 30, 1995

[30] Foreign Application Priority Data

Jul. 4, 1994 [JP] Japan .................................... 6-152237

[51] Int. Cl.$^{6}$ ........................................................ G06T 1/60

[52] U.S. Cl. .......................... 395/508; 345/189; 345/201

[58] Field of Search ................................ 345/189, 97, 98, 345/201; 358/313, 319, 352; 348/412, 415, 699–701; 395/501, 507, 508

[56] References Cited

U.S. PATENT DOCUMENTS

| | | | |
|---|---|---|---|
| 3,553,362 | 1/1971 | Mounts | 348/415 |
| 5,374,941 | 12/1994 | Yuki et al. | 345/97 |
| 5,481,319 | 1/1996 | Kershaw et al. | 348/701 |
| 5,561,476 | 10/1996 | Kershaw et al. | 348/701 |

FOREIGN PATENT DOCUMENTS

| | | |
|---|---|---|
| 0435701 | 7/1991 | European Pat. Off. . |
| 0583102 | 2/1994 | European Pat. Off. . |
| 0608053 | 7/1994 | European Pat. Off. . |

*Primary Examiner*—Kee M. Tung
*Attorney, Agent, or Firm*—Fitzpatrick, Cella, Harper & Scinto

[57] ABSTRACT

An apparatus for detecting a changed portion in display data comprises: an adder for dividing one frame of image data received from an external source into groups of a first predetermined amount of image data and for sequentially adding the groups of image data until they reach a second predetermined amount; a memory for storing the one frame of image data received from the external source; storage means for storing the one frame of image data received from the external source; and a comparator for comparing the image data of the second amount stored in the storage means with image data of the second amount for a next frame added by the adder. A detector, responsive to a comparison result by the comparator indicating that the stored image data of the second amount is different from the image data of the second amount for the next frame, detects that the one frame of image data stored in the memory means has been changed at a portion corresponding to the stored image data of the second amount.

9 Claims, 5 Drawing Sheets

FRAME COMPARISON WITH REDUCED MEMORY VIA CHANGED SCANLINE DETECTION AND POST-ADDITION ROTATIONAL SHIFTING

BACKGROUND OF THE INVENTION

1. Field of the Invention

The invention relates to changed line detecting apparatus and method for detecting a line including a portion changed between frames of a continuous image.

2. Related Background Art

As a matrix panel display, there are plasma display, electroluminescence (EL) display, liquid crystal display, and the like. Among these, the liquid crystal display is used in wide application fields owing to its easiness of observation, low electric power consumption, and the like.

A ferroelectric liquid crystal (hereinafter, referred to as an FLC) has a feature of "memory performance" different from the other liquid crystals. According to such memory performance, the liquid crystal holds a display state changed by applying an electric field. According to the display apparatus using the FLC, even when the number of scanning lines increases, a contrast does not deteriorates due to such memory performance, and a display of a large picture plane and a high precision can be performed. Since the FLC requires a predetermined time to write data of one line, however, when the number of scanning lines is large, a frame frequency decreases and, in a non-interlace scan (in which the picture plane is sequentially scanned in accordance with the order from the top) problems occur such as flickering, and an inability to achieve a high display speed. To prevent such problems, a "multi-interlace" (skip scanning in which a plurality of lines are skipped) system or a "partial preferential scan" (scanning in which the changed line is preferentially scanned) system is needed.

As a method of recognizing the changed line, hitherto, there is a method of monitoring an access to a video memory on a display card. According to such a method, however, a dependency on the display card specifications is high and a different detecting apparatus has to be formed for every display card. Further, although a method of obtaining rewriting area information from a graphics software exists in such a method, a special change has to be made to the graphics software of each system. In any case, according to the methods as mentioned above, it is difficult to cope with a number of various kinds of computer systems and display systems.

On the other hand, as a method of detecting a changed line which can cope with a number of various kinds of computer systems, there is a method of detecting a changed portion from a difference between continuous frames of video data outputted from a display card. However, according to a method of simply comparing all of the pixels of a display screen, a memory of one frame is necessary to detect the changed line. Particularly, the use of such a method in a system requiring high resolution, will incur a high cost.

SUMMARY OF THE INVENTION

The present invention intends to solve the problems as mentioned above and to provide changed line detecting apparatus and method which can detect a changed line by performing a comparison between frames by using a small portion of resident memory capacity.

According to the present invention, there is provided a changed line detecting apparatus for detecting a line including a portion changed between frames of a continuous image, comprising: latch means for latching 1-line pixel data which is inputted every (n) pixels (n is a positive integer); a register; adding means for adding a value stored in the register and the value latched by the latch means; storage means for storing the value obtained by the addition by the adding means into the register; shifting means for rotationally shifting the stored data by only a predetermined number of bits each time the data is stored into the register by the storage means; total addition value storage means for storing a total addition value obtained after the addition by the adding means was repeated a predetermined number of times; judging means for judging whether the current total addition value stored by the total addition value storage means coincides with the total addition value at the same position of a previous frame or not; and output means for outputting a signal indicative of the presence of a change in the line in the case where it is judged by the judging means that those total addition values coincide and for outputting a signal indicative of the absence of a change in the line in the case where it is judged that they don't coincide.

According to the invention, there is also provided a changed line detecting method of detecting a line including a portion changed between frames of a continuous image, comprising: a latching step of latching 1-line pixel data which is inputted every (n) pixels (n is a positive integer); an adding step of adding the latched value and a value stored in a register; a storing step of storing the value obtained by the addition into the register; a shifting step of rotationally shifting the stored data by only a predetermined number of bits; a total addition value storing step of storing a total addition value obtained after the latching step, adding step, and storing step were repeated a predetermined number of times; a judging step of judging whether the stored current total addition value coincides with the total addition value at the same position of a previous frame or not; and an output step of outputting a signal indicative of the presence of a change in the line in the case where it is judged that those total addition values coincide and outputting a signal indicative of the absence of a change in the line when it is Judged that they don't coincide.

According to the changed line detecting apparatus of the invention, the 1-line pixel data which is inputted is latched by the latch means every (n) pixels (n is a positive integer). The value stored in the register and the value latched by the latch means are added by the adding means. The value obtained by the addition is stored into the register by the storage means. The data stored in the register is rotationally shifted by the shifting means by only a predetermined number of bits. The total addition value obtained, after the addition by the adding means was repeated a predetermined number of times, is stored by the total addition value storage means. Whether the current total addition value stored coincides with the total addition value at the same position of the previous frame stored by the total addition value storage means or not is judged by the judging means. When it is judged that they coincide, a signal indicating that there is a change in the line is generated by the output means. When it is judged that they don't coincide, a signal indicating that there is no change in the line is generated by the output means.

According to the changed line detecting method of the invention, the 1-line pixel data which is inputted is latched every (n) pixels (n is a positive integer). The latched value is added to the value stored in the register. The value obtained by the addition is stored in the register. The process for rotationally shifting the stored data by only a predetermined number of bits is repeated a predetermined number of times. The obtained total addition value is stored. Whether the stored current total addition value coincides with the total addition value at the same position of the previous frame or not is judged. When it is judged that they coincide, the signal indicating that there is a change in the line is outputted. When it is judged that they don't coincide, a signal indicating that there is no change in the line is outputted.

DETAILED DESCRIPTION OF THE PREFERRED EMBODIMENT

An embodiment of the present invention will now be described hereinbelow in detail with reference to the drawings.

Figure 1:
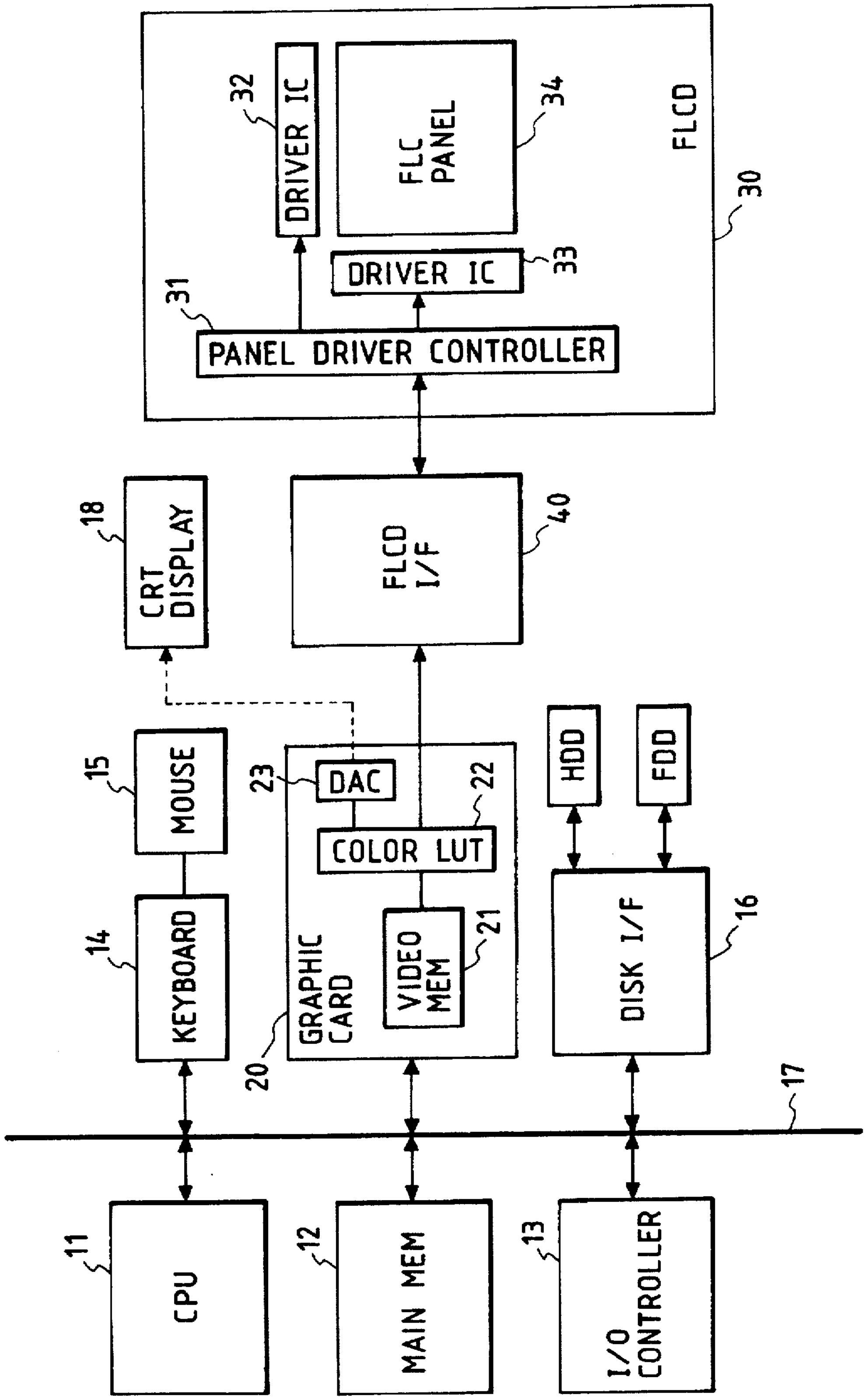
FIG. 1 is a block diagram showing an embodiment of the invention.

FIG. 1 shows an embodiment of the invention and relates to an example of an information processing system. In FIG. 1, reference numeral 11 denotes a CPU to control a whole information processing system; 12 a main memory which is used for storing programs to be executed by the CPU 11 and is used as a work area when the CPU 11 executes the program; 13 an input/output controller (I/O controller) having an interface such as RS-232C or the like; 14 a keyboard for inputting character information and control information from the user; 15 a mouse as a pointing device; 16 a disk interface for controlling a hard disk drive and a floppy disk drive serving as external memory devices; 17 a bus system comprising a data bus, a control bus, and an address bus for connecting signals among those equipment; and 20 a graphic card, having a video memory to store display contents, for transferring video data to a CRT (cathode ray tube) display 18.

Reference numeral 40 denotes a ferroelectric liquid crystal display interface (hereinafter, referred to as an FLCD interface); and 30 indicates a ferroelectric liquid crystal display (hereinafter, referred to as an FLCD). An FLC display panel 34 has matrix-shaped electrodes and is constructed by sealing a ferroelectric liquid crystal into two glass plates which were subjected to an orientating process. Information electrodes and scan electrodes are respectively connected to an information line side driver IC 32 and a scanning line side driver IC 33. Reference numeral 31 denotes a panel driver controller to control panel driving. The FLCD used in the embodiment have specifications such that panel size is set to 15 inches and the resolution is set to 1024 dots in the vertical direction and 1280 dots in the lateral direction. However, since one pixel is divided into subpixels with color filters of R, G, B, and W, a display of 16 colors (4 bits/pixel) can be performed for one pixel by a combination of light on/off operations of the subpixels.

With the above construction, the CPU 11 reads out the data from the main memory 12 and supplies to the graphic card 20 in order to display data such as a document or the like formed.

Figure 2:
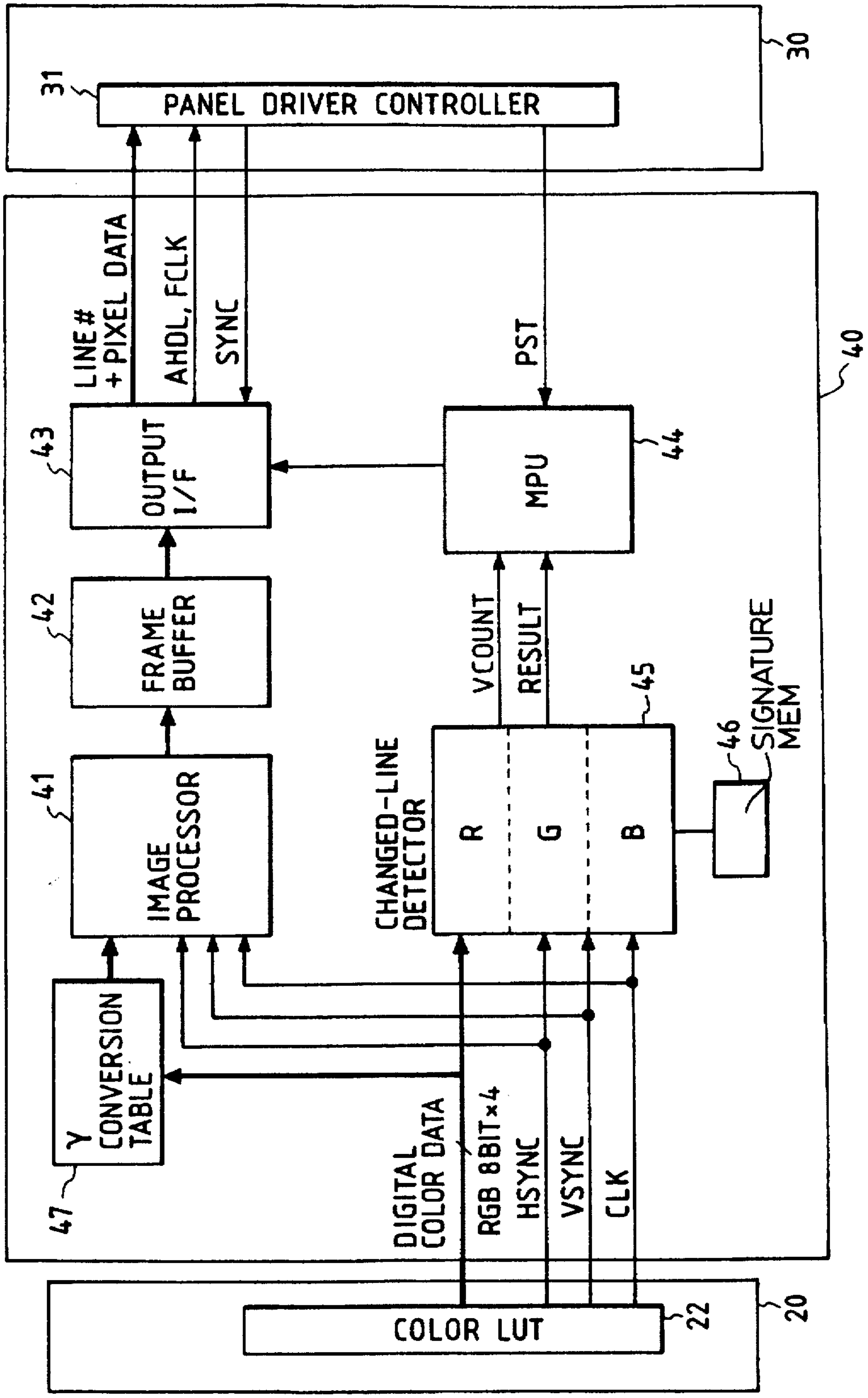
FIG. 2 is a block diagram showing a construction of an FLCD interface 40 shown in FIG. 1.

FIG. 2 shows a construction of the FLCD interface 40 shown in FIG. 1.

Digital color data from a color LUT (Look-up Table) 22 of the graphic card 20 is gamma converted by a gamma conversion table 47 and is inputted to an image processor 41. The image processor 41 executes a color converting process from eight bits of each of R, G, and B data to one bit of each of R, G, B, and W (16 colors). The processing result of one frame is stored in a frame buffer 42. The data stored in the frame buffer 42 is coupled with scanning line address information indicative of the scanning line to display the data by an output interface (I/F) 43. The coupled data is transferred to the panel driver controller 31 (in the diagram, Pixel Data, Line#). In the diagram, AHDL and FCLK denote timing signals which are necessary in this instance. To transfer the scanning line address information and the display data by the same line, when the AHDL signal is at the high level, this means that the address information has been transferred. When the AHDL signal is at the low level, this means that the display data has been transferred. FLCK denotes a dot clock signal.

The panel driver controller 31 displays the transmitted display data to the scanning line corresponding to the scanning line address information. By transferring the data with the scanning line address as mentioned above, the FLCD interface 40 can freely control the scan of an arbitrary line on the display panel. On the basis of a detection result from the changed-line detector 45, which will be explained hereinlater, an MPU 44 performs a control of the "partial preferential scan" to preferentially scan the changed line.

Since the FLCD has a scanning speed depending on a temperature, it is necessary to generate a sync signal for the data transfer from the FLCD side. For this purpose, a sync signal (in the diagram, Sync) when transferring the data of one scanning line and a panel status signal (in the diagram, Pst) serving as a signal indicative of the current scanning speed of the display panel are inputted from the panel driver controller 31.

The changed-line detector 45 receives the digital color data from the color LUT 22, detects the data different from the data of the previous frame, namely, the changed line with respect to each of R, G, and B, and notifies the detection result to the MPU 44. In accordance with a signal from the changed-line detector 45, the MPU 44 transfers the data to the panel driver controller 31 so as to preferentially scan the line.

Figure 3A:
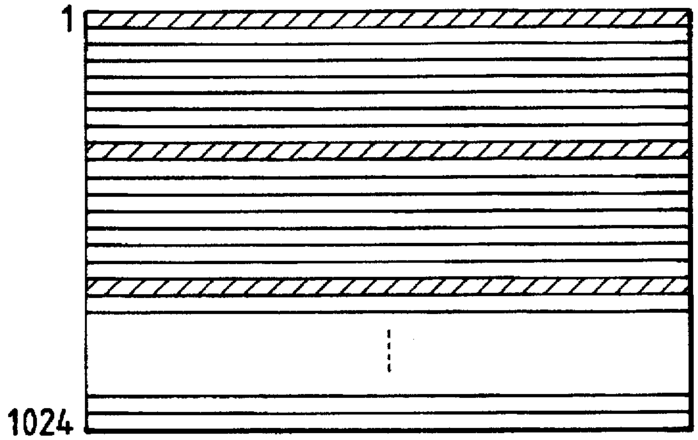
FIGS. 3A and 3B are diagrams for explaining a partial preferential scan on the FLCD.
Figure 3B:
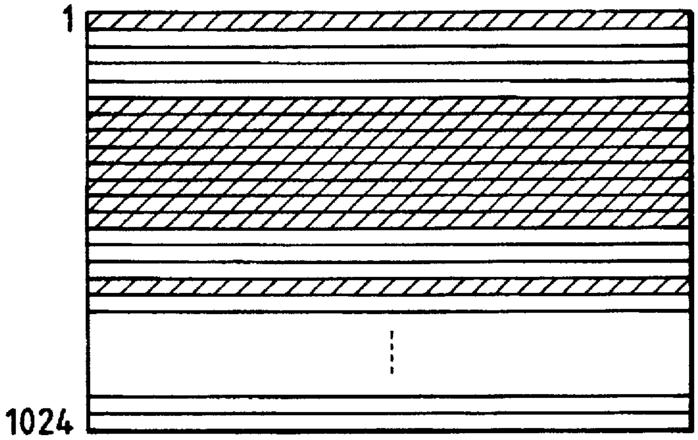

FIGS. 3A and 3B show states of the partial preferential scan on the FLCD. In those diagrams, a hatched portion shows a line to be scanned in one field (defined as a period of time during which the scan advances from the upper position to the lower position of the screen). FIG. 3A shows a state in the case where there is no change between frames. In this case, the scan is executed by a simple jump of eight scanning lines (namely, the lines 1, 9, 17, . . . are scanned) and there is no line that is particularly preferentially scanned. FIG. 3B shows a state in the case where there is a change between frames and changes occur in the lines shown by hatching in the diagram. As mentioned above, by performing the non-interlace scan to the changed line or by executing the skip scan to the line with no change in the field, the changed line is preferentially scanned.

Figure 4:
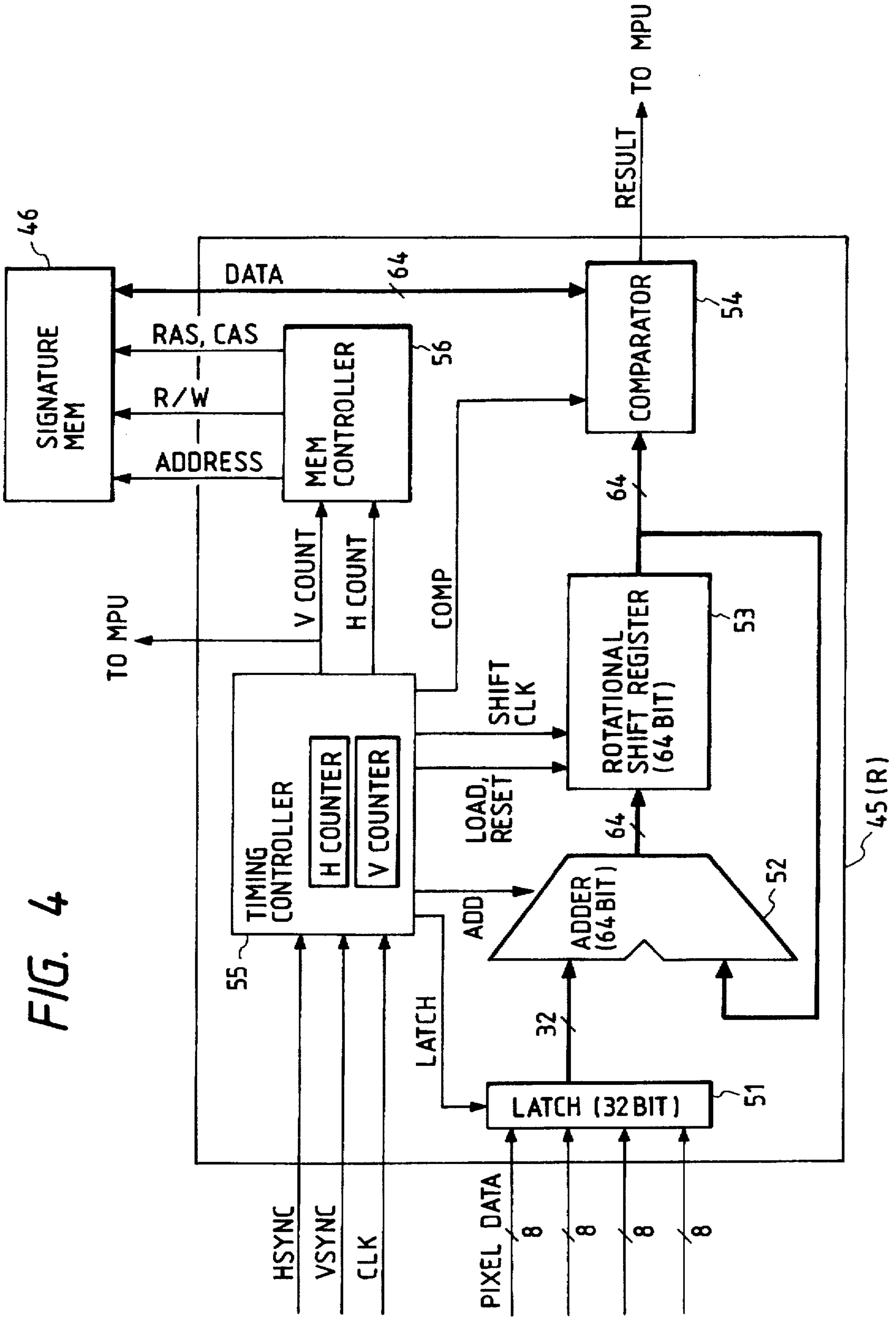
FIG. 4 is a block diagram showing a changed-line detector 45 shown in FIG. 2.

FIG. 4 shows one of three detection circuits (RGB) of the changed-line detector 45 shown in FIG. 2. In the diagram, reference numerals 51 denotes a latch of 32 bits; 52 an adder in which each of an input and an output consists of 64 bits; 53 a rotational shift register of 64 bits; 54 a comparator for comparing a Signature, which will be explained hereinlater; and 55 a timing controller to control the timing of each of the above sections. The timing controller 55 has counters for counting the number of pixels in the lateral direction and the number of lines.

The counter in the lateral direction (H counter) counts the number of CLK (clock signals of a pixel unit) and is reset by an HSYNC (horizontal sync signal). A counter of the line number (V counter) counts the number of HSYNC and is reset by a VSYNC (vertical sync signal). Reference numeral 46 denotes a Signature memory to store Signatures of one frame and 56 indicates a memory controller to control the reading and writing operations of the Signature memory 46 in accordance with a count value of the timing controller.

Figure 5:
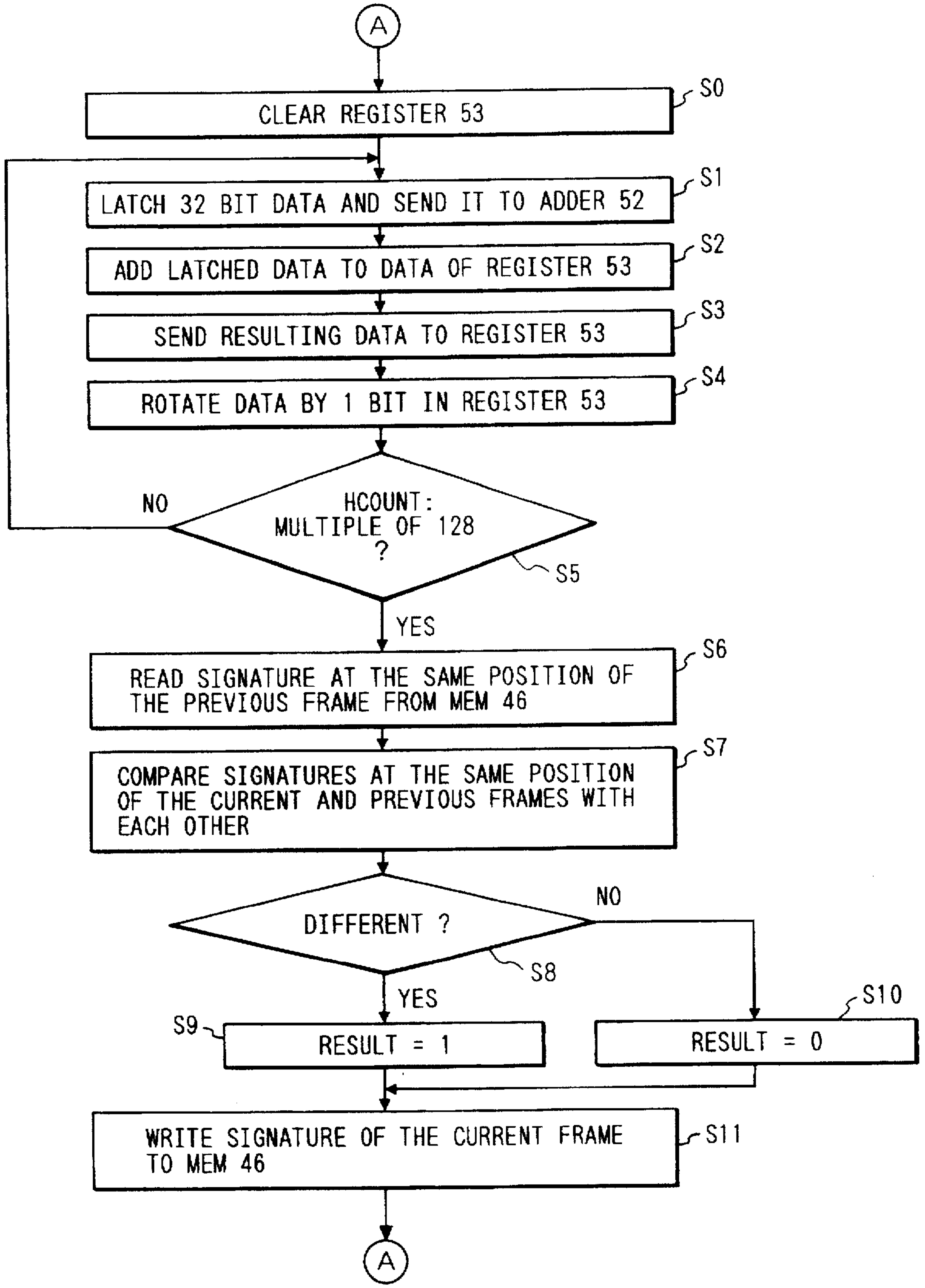
FIG. 5 is a flowchart showing the operation to detect a changed line.

FIG. 5 is a flowchart showing the operation of the changed-line detector 45 shown in FIG. 2.

Figure 6:
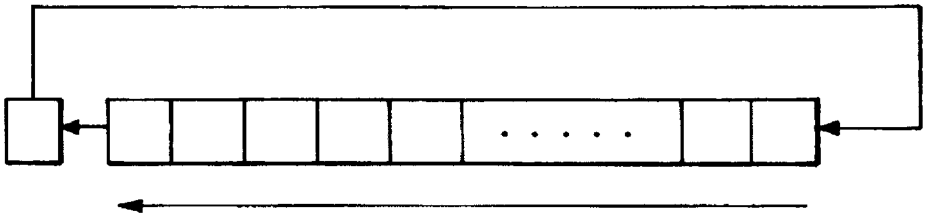
FIG. 6 is an explanatory diagram for explaining the operation of a rotational shift register.

First, the rotational shift register 53 is cleared (s0). Subsequently, pixel data (luminance information of each pixel) of (8 bits×4) which is inputted from the color LUT 22 is latched by the latch 51 and is sent to the adder 52 as 32-bit data (s1). The adder 52 adds the 32-bit data and a value in the rotational shift register 53. However, since the initial rotational shift register has been reset (s0), the 32-bit data is added with "0" in this instance (s2). The 64-bit data obtained by the addition is sent to the rotational shift register (s3) and is rotationally shifted by one bit (s4). Further, the shifted data is added to the next 32-bit data (s2). FIG. 6 shows a state of the rotational shifting operation. This operation is executed synchronously with the input of the data. Therefore, when the latch of the data, addition, and shift are executed by one cycle, the H count value is increased by four at a time.

When the operation is repeated a predetermined number of times (in the embodiment, 128/4=32 times) (s5), the value of the rotational shift register is sent as a "Signature" to the comparator (s6), by which it is compared with the "Signature" at the same position of the previous frame (s7). When those Signatures are different, the comparator 54 generates Result=1 to the MPU 44 (s9). When they are equal, the comparator 54 generates Result=0 (s10). In this instance, the count value (Vcount) of the number of lines of the timing controller 55 is also simultaneously outputted. The Signature data of the current frame is stored into the Signature memory 46 in order to compare with the Signature of the next frame (s11).

The above operation is repeated ten times to detect a change in one line (1280 pixels). However, if there is an output of Result=1 even in at least one of ten times, the MPU 44 judges that there is a change in such a line, so that the MPU 44 controls the scan so as to preferentially scan the line as already described above.

Although only one operation among the three detection circuits of RGB has been described above, when there is an output of Result=1 in any one of the three detection circuits of RGB, the MPU 44 regards that there is a change in such a line.

The amount of memory used to detect the changed line in the embodiment is one Signature (64 bits) per 128 pixels. Therefore, 1280 (*H*)/128 (*pixels*)×64 (bits) ×3 (colors)×1024 (*V*)=245760 *bytes*

Since one frame as stored in the memory, corresponds to 3932160 bytes, the memory capacity required is reduced to 1/16 of the memory for storing the whole frame.

The reasons why the rotational shift is executed every addition in the embodiment and its effects will now be described. The "movement" of an object displayed on the display is frequently executed. For example, it is now assumed that the vertical line is moved in the lateral direction by a distance of four pixels (=32 bits). In such a case, if the rotational shift is not performed after completion of the addition, the addition result becomes identical and the change occurring in the line cannot be detected. Namely, the partial preferential scan of the line cannot be executed. However, by executing the rotational shift after the addition, as in the embodiment, even in the case where the vertical line is moved in the lateral direction by four pixels as mentioned above, the addition result is not identical and the change can be detected.

According to the embodiment, therefore, by preserving the added data, the memory capacity necessary for comparison between the frames can be reduced. By executing the rotational shift every addition, the detection leakage is reduced. A sufficient result can be obtained as a detection of the changed line for the partial preferential scan.

Although the example in which the rotational shift is executed so as to shift to the left by one bit as shown in FIG. 6 has been described, the invention is not limited to such an example. For instance, even in case of a shift to the right or a shift of a multi-bits instead of the 1-bit shift, similar results and effects can be obtained.

According to the invention as described above in detail, even with a small memory capacity, the line changed between frames can be detected. The costs and the number of chips which are necessary for detection of the changed line can be remarkably reduced.

What is claimed is:

1. An apparatus for detecting a changed portion in display data comprising:

adding means for dividing one frame of image data received from an external source into groups of a first predetermined amount of image data and for sequentially adding the groups of image data until a second predetermined amount of image data is reached;

memory means for storing the one frame of image data received from the external source;

storage means for storing the image data of the second amount added by said adding means;

comparing means for comparing the image data of the second amount stored in said storage means with image data of the second amount for a next frame added by said adding means; and detecting means, responsive to a comparison result from said comparing means indicating that the stored image data of the second amount is different from the image data of the second amount for the next frame, for detecting that the one frame of image data stored in said memory means has been changed at a portion corresponding to the stored image data of the second amount.

2. An apparatus according to claim 1, further comprising:

display means; and display control means for controlling said display means to preferentially display the one frame of image data which was detected by said detecting means.

3. An apparatus according to claim 2, wherein said display means includes a ferroelectric liquid crystal display panel.

4. An apparatus according to claim 1, further comprising control means, responsive to a detection by said detecting means, for controlling said memory means to replace the portion of the one frame of image data with image data of the second amount for the next frame.

5. An apparatus according to claim 1, further comprising shift register means for sequentially shifting the image data added by said adding means.

6. A method for detecting a changed portion in display data, comprising the steps of:

dividing one frame of image data received from an external source into groups of a first predetermined amount of image data and sequentially adding the groups image data until they reach a second predetermined amount;

storing the one frame of image data received from the external source in a memory means;

storing the image data of the second amount added by said dividing step in a storage means;

comparing the image data of the second amount stored in the storage means with image data of the second amount for a next frame added at said dividing step; and responsive to a comparison result from said comparing step indicating that the stored image data of the second amount is different from the image data of the second amount for the next frame, detecting that the one frame of image data stored in the memory means has been changed at a portion corresponding to the stored image data of the second amount.

7. A method according to claim 6, wherein the image data stored in the memory means is preferentially displayed to a display screen.

8. A method according to claim 6, further comprising, responsive to a detection by said detecting step, the step of controlling the memory means to replace the portion of the one frame of image data with the image data of the second amount for the next frame.

9. A method according to claim 6, further comprising a step of sequentially shifting, by a shift register, the image data added at said dividing step.

* * * * *

UNITED STATES PATENT AND TRADEMARK OFFICE

CERTIFICATE OF CORRECTION

PATENT NO. : 5,717,906

DATED : February 10, 1998

INVENTOR(S): SHUNTARO ARATANI

It is certified that error appears in the above-identified patent and that said Letters Patent is hereby corrected as shown below:

COLUMN 1
Line 24, "deteriorates" should read --deteriorate--;
Line 57, "resolution," should read --resolution--.

COLUMN 2
Line 39, "Judged" should read --judged--.

COLUMN 3
Line 65, "supplies" should read --supplies it--.

COLUMN 7
Line 9, "groups" should read --groups of--.

Signed and Sealed this

Twenty-seventh Day of October, 1998

Attest:

BRUCE LEHMAN

*Attesting Officer* — *Commissioner of Patents and Trademarks*